US006674729B1

(12) United States Patent
DuRee (10) Patent No.: US 6,674,729 B1
(45) Date of Patent: Jan. 6, 2004

(54) COMMUNICATIONS SYSTEM FOR PROVIDING ATM CONNECTIONS AND ECHO CANCELLATION

(75) Inventor: Albert Daniel DuRee, Independence, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/546,785

(22) Filed: Apr. 11, 2000

Related U.S. Application Data (63) Continuation of application No. 08/840,317, filed on Apr. 16, 1997, now Pat. No. 6,067,299.

(51) Int. Cl.[7] .................................................. H04B 3/20

(52) U.S. Cl. ........................ 370/286; 370/352; 370/356; 370/395.1; 370/395.61

(58) Field of Search ................................. 370/282, 286, 370/289, 352, 356, 389, 392, 395.1, 397, 399, 395.2, 395.3, 395.6, 395.61, 467

(56) References Cited

U.S. PATENT DOCUMENTS

| 4,720,850 A | 1/1988 | Oberlander |
| 4,763,317 A | 8/1988 | Lehman et al. |
| 5,051,983 A | 9/1991 | Kammerl |
| 5,115,427 A | 5/1992 | Johnson, Jr. et al. |
| 5,182,550 A | 1/1993 | Masuda et al. |
| 5,204,857 A | 4/1993 | Obara |
| 5,289,536 A | 2/1994 | Hokari |
| 5,327,421 A | 7/1994 | Hiller et al. |
| 5,339,318 A | 8/1994 | Tanaka et al. |
| 5,345,445 A | 9/1994 | Hiller et al. |
| 5,434,852 A | 7/1995 | La Porta et al. |
| 5,459,721 A | 10/1995 | Yoshida |
| 5,459,722 A | 10/1995 | Sherif |
| 5,469,501 A | 11/1995 | Otsuka |
| 5,483,527 A | 1/1996 | Doshi et al. |
| 5,509,010 A | 4/1996 | La Porta et al. |
| 5,513,180 A | 4/1996 | Miyake et al. |
| 5,526,359 A | 6/1996 | Read et al. |
| 5,530,724 A | 6/1996 | Abrams et al. |
| 5,541,917 A | 7/1996 | Farris |

(List continued on next page.)

OTHER PUBLICATIONS

Helen A. Bauer, John J. Kulzer, Edward G. Sable, "Designing Service–Independent Capabilities for Intelligent Networks," IEEE, Dec. 1988, pp. 31–41.

ITU–T Q. 1219, "Intelligent Network User's Guide For Capability Set 1," Apr., 1994.

Thorner, "Intelligent Networks, Capter 2," 1994, Artech House, pp. 11–107.

ITU–T, Recommendation Q.722, "Specifications of Signalling System No. 7, General Function of Telephone Messages and Signals," 1993.

(List continued on next page.)

*Primary Examiner*—Chi Pham
*Assistant Examiner*—Anh-Vu H Ly (57) ABSTRACT

A method and system provides connections to an ATM system and includes selective echo cancellation. The invention includes two interworking units, an echo canceller, and a signaling processor. The signaling processor receives and processes signaling to provide connection control instructions to the interworking units. The first interworking unit will accept a connection, and if the connection does not require echo cancellation, interwork the incoming connection with an ATM connection to the ATM system. If the incoming connection requires echo cancellation, the first interworking unit will interwork the incoming connection with an ATM connection to the second interworking unit. The second interworking unit will interwork the ATM connection with another connection to echo cancellation. After echo cancellation, the second interworking unit will interwork the connection from echo cancellation with another ATM connection to the ATM system.

12 Claims, 9 Drawing Sheets

U.S. PATENT DOCUMENTS

| | | |
|---|---|---|
| 5,568,475 A | 10/1996 | Doshi et al. |
| 5,583,849 A | 12/1996 | Ziemann et al. |
| 5,623,491 A | 4/1997 | Skoog |
| 5,684,792 A | 11/1997 | Ishihara |
| 5,765,108 A | 6/1998 | Martin et al. |
| 5,784,371 A | 7/1998 | Iwai |
| 5,825,780 A | 10/1998 | Christie |
| 5,867,562 A | 2/1999 | Scherer |
| 5,889,773 A | 3/1999 | Stevenson, III |
| 5,917,815 A | 6/1999 | Byers et al. |
| 5,920,562 A | 7/1999 | Christie, et al. |
| 5,991,301 A | 11/1999 | Christie |
| 6,023,474 A | 2/2000 | Gardner et al. |
| 6,026,086 A | 2/2000 | Lancelot et al. |
| 6,041,043 A | 3/2000 | Denton et al. |
| 6,067,299 A * | 5/2000 | DuRee ............... 370/397 |
| 6,181,703 B1 | 1/2001 | Christie et al. |
| 6,324,179 B1 | 11/2001 | Doshi et al. |
| 6,411,624 B1 * | 6/2002 | Christie et al. ....... 370/395.31 |
| 6,487,200 B1 * | 11/2002 | Fraser ............... 370/389 |

OTHER PUBLICATIONS

Schink, "CES As A Flexible Trunking Method", ATM Forum Technical Committee 95–1157, Oct. 2–6, 1995.

Caves, Proposed modifications to the baseline text (95–0446R2) of the "VTOA—ATM Trunking For Narrowband Services Specification", ATM Forum Technical Committee 95–1134, Oct. 2–6, 1995.

Caves, "ATM Trunking: Network Delay And Echo Control Issues", ATM Forum Technical Committee 95–1135, Oct. 2–6, 1995.

* cited by examiner

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 7

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 8

| EXCEPTION TABLE INDEX | CARRIER SELECTION IDENTIFICATION | CARRIER IDENTIFICATION | CALLED PARTY | | | NEXT FUNCTION | INDEX |
|---|---|---|---|---|---|---|---|
| | | | NATURE OF ADDRESS | DIGITS FROM | DIGITS TO | | |
| | | | | | | | |
| | | | | | | | |
| | | | | | | | |

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |

FIG. 11

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 12

| ROUTING TABLE INDEX | TRANSIT NETWORK SELECTION | | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | | | | | | | | |
| | | | | | | | | | | | |

FIG. 13

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

| MESSAGE TYPE | PARAMETERS | INDEX #1 | INDEX # ... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE NUMBER | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 14*

COMMUNICATIONS SYSTEM FOR PROVIDING ATM CONNECTIONS AND ECHO CANCELLATION

CROSS-REFERENCE TO RELATED APPLICATIONS

This application is a continuation of prior application Ser. No. 08/840,317 filed Apr. 16, 1997, now U.S. Pat. No. 6,067,299 entitled "COMMUNICATION SYSTEM FOR PROVIDING ATM CONNECTIONS AND ECHO CANCELLATION," currently pending, incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communications systems, and in particular, to a communications system that provides Asynchronous Transfer Mode (ATM) connections and echo cancellation.

2. Description of the Prior Art

At present, long distance networks are deploying ATM systems to carry traffic. At the same time, de-regulation in the local telecommunications environment is creating the opportunity for multiple local networks to compete in the same territory. These local networks will require interconnection for calls that originate in one local network and terminate in another local network. In addition, these local networks will need access to the ATM equipment in the long distance networks.

Voice traffic that travels long distances requires echo cancellation. Echo cancellation removes reflections from the impedance mismatch caused by 4-wire/2-wire conversions at the user end.

At present there is a need for a system that provides connections between communications devices in different local networks, and between communications devices in the same local network. There is also a need for a system that provides connections with echo cancellation between local Time Division Multiplex (TDM) networks and long distance ATM networks.

SUMMARY OF THE INVENTION

The invention provides a method and communications system for providing ATM connections and echo cancellation to a communications device. The communications device could be in a local network, and the ATM connection could be in a long distance network. The invention comprises a first interworking unit, a second interworking unit, an echo canceller, and a signaling processor. The first interworking unit is connected to the signaling processor and the second interworking unit. The second interworking unit is connected to the signaling processor and to the echo canceller.

The first interworking unit accepts a first DS0 from the communications device. The signaling processor receives sionaling related to the first DS0, and processes the signaling to select a first ATM virtual connection from the first interworking unit to the second interworking unit, and to select a second ATM virtual connection from the second interworking unit to the ATM network. The signaling processor provides a first control instruction to the first interworking unit that identifies the first DS0 and the first ATM virtual connection. The signaling processor provides a second control instruction to the second interworking unit that identifies a second DS0 to the echo canceller and the second ATM virtual connection.

The first interworking unit interworks the first DS0 with the first ATM virtual connection. The second interworking unit interworks the first ATM virtual connection with the second DS0 to the echo canceller. The echo canceller cancels echo from the second DS0 and provides the second DS0 back to the second interworking unit. The second interworking unit interworks the second DS0 back from the echo canceller with the second ATM virtual connection.

In some embodiments, the invention establishes communications between the ATM network and a second communications device. The second interworking unit accepts a third ATM virtual connection from the ATM network. The signaling processor receives signaling related to the third ATM virtual connection, and processes the signaling to select a third DS0 from the second interworking unit to the echo canceller, and to select a fourth DS0 from the first interworking unit to the second communications device. The signaling processor provides a third control instruction to the second interworking unit that identifies the third ATM virtual connection and the third DS0. The signaling processor provides a fourth control instruction to the first interworking unit that identifies a fourth ATM virtual connection and the fourth DS0. The second interworking unit interworks the third ATM virtual connection with the third DS0 to the echo canceller. The echo canceller cancels echo from the third DS0 and provides the third DS0 back to the second interworking unit. The second interworking unit interworks the third DS0 back from the echo canceller with the fourth ATM virtual connection. The first interworking unit interworks the fourth ATM virtual connection with the fourth DS0.

In some embodiments, the invention establishes communications between a second communications device and a third communications device. The communications system further comprises an ATM matrix that is connected to the first interworking unit. The first interworking unit accepting a third DS0 from the second communications device. The signaling processor receives signaling related to the third DS0, and processes the signaling to select a third ATM virtual connection from the first interworking unit to the ATM matrix and back to the first interworking unit, and to select a fourth DS0 from the first interworking unit to the third communications device. The signaling processor provides a third control instruction to the first interworking unit that identifies the third DS0, the third ATM virtual connection, and the fourth DS0. The first interworking unit interworks the third DS0 with the third ATM virtual connection to the ATM matrix and interworks the third ATM virtual connection back from the ATM matrix with the fourth DS0.

DETAILED DESCRIPTION OF THE PREFERRED EMBODIMENT

Figure 1:
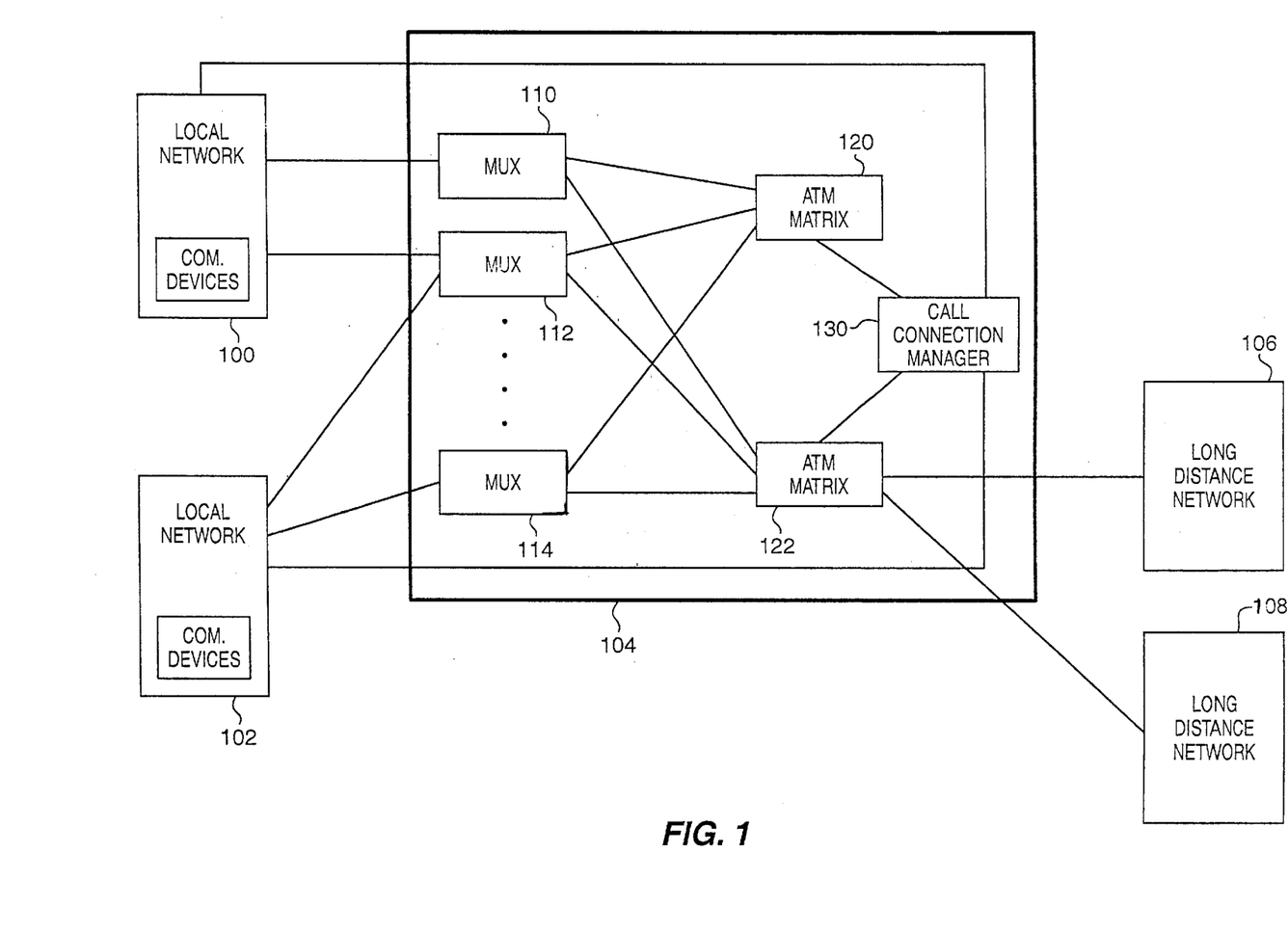
FIG. 1 is a block diagram of a version of the invention.

The invention provides connections between communications devices. These devices could be telephones, switches, computers, or any device that uses communications. The devices could be located in local networks. The invention also provides ATM connections with echo cancellation. These ATM connections could be provided between local TDM networks and long distance ATM networks. FIG. 1 depicts an example of the invention. Those skilled in the art will appreciate numerous variations and permutations of the invention from FIG. 1. Shown on FIG. 1 are: local network 100, local network 102, communications system 104, long distance network 106, and long distance network 108. Local network 102, local network 104, long distance network 106, and long distance network 108 are well known in the art. Communications system 104 interconnects these local and long distance networks as described in detail below.

In the context of the invention, the local networks represent any communications device that desires connections, including connections to an ATM system. As such, communications devices are depicted within the local networks, although the communication devices could be anywhere. The long distance network represents any ATM system. Communications system 104 comprises: ATM interworking multiplexer (mux) 110, mux 112, mux 114, ATM matrix 120, ATM matrix 122, and call/connection manager (CCM) 130. As indicated on FIG. 1, additional muxes could be shown, but have been omitted for reasons of clarity. Local network 100 is connected to muxes 110 and 112 with conventional TDM connections, such as DS3, DS2, DS1, or DS0. (or their European counterparts E3, E2, E1, or E0). Local network 102 is connected to mux 112 and mux 114 in a similar fashion. Both local network 100 and local network 102 are connected to CCM 130 with control links—typically Signaling System #7 (SS7) links. Muxes 110, 112, and 114 are each connected to ATM matrix 120 and to ATM matrix 122 with ATM virtual connections. CCM 130 is connected to both ATM matrix 120 and ATM matrix ATM 122 with ATM virtual connections. ATM matrix 122 is connected to long distance network 106 and to long distance network 108:with ATM virtual connections. Typically, ATM virtual connections are designated by a Virtual Path Identification/Virtual Channel Identification (VPI/VCI).

CCM 130 exchanges signaling with the local and long distance networks and exerts control over communications system 104. CCM 130 exchanges signaling with the local networks over the control links discussed above. CCM 130 exchanges signaling with the long distance networks using control links to the long distance networks that are established within the ATM virtual connections through ATM matrix 122. CCM 130 exerts control over the muxes using control links to the muxes that are established within the ATM virtual connections through ATM matrix 120 and ATM matrix 122. Skilled artisans will appreciate that Signal Transfer Points (STPs) and/or Service Control through ATM matrix 120 and Service. Control Points (SCPs) are commonly used within SS7, but have been omitted for purposes of clarity.

Interworking provides a conversion between different formats, such as TDM and ATM. The muxes are each able to interwork between TDM and ATM traffic on a per call basis in response to control instructions from the CCM. Typically, this requires breaking down the local network traffic to the DS0 level. The mux also accepts a control instruction from CCM 130 assigning a particular DS0 to a particular ATM virtual connection for a call. During that call, mux 110. will interwork the assigned DS0 with the assigned virtual connection. The muxes are each able to automatically interwork. between TDM and ATM traffic on a per call basis. The term "automatically" refers to a mux being pre-provisioned to interwork the particular connections. As will be discussed in detail below, the mux can also apply echo cancellation to selected calls.

ATM matrix 120 provides ATM interconnections among the muxes, and also between the muxes and CCM 130. ATM matrix 122 provides ATM interconnections between the muxes and the long distance networks, and also between CCM 130 and the long distance networks. ATM matrix 120 and ATM matrix 122 could be combined into a single ATM matrix. ATM matrix 122 and ATM matrix could be ATM cross-connects or ATM switches which are both well known in the art.

CCM 130 exchanges signaling with the local and long distance networks and provides control instructions to the muxes. On a call from a local or long distance network, CCM 130 would accept the signaling from the particular network. CCM 130 would process the signaling and select connection assignments for the call. CCM 130 would provide the assignments as a control instruction to the appropriate mux. Typically, CCM 130 will cause the mux to apply echo cancellation on calls that use a long distance network.

Some illustrative examples will now be discussed. Skilled artisans will appreciate variations and permutations of these examples that are within the scope of the invention. First, take the example of a call from local network 100 to local network 102. A communications device in local network 100 would seize a DS0 port on mux 110 and send an SS7 Initial Address Message (IAM) to CCM 130. CCM 130 will process the IAM and identify local network 102 as the destination. This could be done by analyzing the called number. CCM 130 would select an ATM virtual connection from mux 110 through ATM matrix 120 to mux 114. CCM 130 would provide a control instruction to mux 110 identifying the incoming DS0 from local network 100 and the selected ATM virtual connection through ATM matrix 120 to mux 114. CCM 130 would also select a DS0 connection from mux 114 to a communications device in local network 102. CCM 130 would provide a control instruction to mux 114 identifying the selected ATM virtual connection from mux 110 the outbound DS0 to the communications device in local network 102. Mux 110 would interwork the DS0 from local network 100 with the ATM virtual connection through ATM matrix 120 to mux 114. Mux 114 would interwork the ATM virtual connection from mux 110 through ATM matrix 120 with the DS0 to the communications device in local network 102. CCM 130 would also exchange signaling with both local networks during call set-up. As a result, a call connection is set up from local network 100 through mux 110, ATM matrix 120, and mux 114 to local network 102. One can appreciate that mux 112 could have been used in the alternative to ingress or egress the call or that the same mux could both ingress and egress a call.

Next, take the example of a call from local network 100 to long distance network 106. A communications device in local network 100 would seize a DS0 port on mux 110 and send an SS7 IAM to CCM 130. CCM 130 will process the IAM and identify long distance network 106 as the destination. This could be done by analyzing the called number. CCM 130 would select an ATM virtual connection that will cause echo cancellation to be applied within mux 110. CCM 130 will also select an ATM virtual connection from mux 110 through ATM matrix 122 to long distance network 106. CCM 130 would provide a control instruction to mux 110 identifying the incoming DS0 from local network 100, the selected ATM virtual connection for echo cancellation, the DS0 from echo cancellation, and the selected ATM virtual connection through ATM matrix 122 to long distance network 106. Mux 110 would interwork the DS0 from local network 100 with the ATM virtual connection for echo cancellation. Mux 110 would automatically interwork this ATM virtual connection with a DS0 for echo cancellation. Mux 110 would then interwork the DS0 from the echo cancellation with the ATM virtual connection through ATM matrix 122 to long distance network 106. CCM 130 would also exchange signaling with local network 100 and long distance network 106 during call set-up. As a result, a call connection is set up from local network 100 through mux 110 and ATM matrix 122 to long distance network 106. One can appreciate that mux 112 could have been used in the alternative to ingress the call.

Next, take the example of a call from long distance network 106 to local network 100. Long distance network 106 would seize an ATM virtual connection through ATM matrix 122 to mux 110 and send a call set-up message through ATM matrix 122 to CCM 130. CCM 130 will process the set-up message and identify local network 100 as the destination. This could be done by analyzing the called number. CCM 130 would select a DS0 connection that will cause echo cancellation to be applied within mux 110 and a DS0 connection to local network 100. CCM 130 would provide a control instruction to mux 110 identifying the ATM virtual connection from long distance network 108 through ATM matrix 122, the selected DS0 for echo cancellation, the ATM virtual connection from echo cancellation, and the selected outbound DS0 to local network 100. Mux 110 would interwork the ATM virtual connection from long distance network 108 with the DS0 for echo cancellation. Mux 110 would automatically interwork the DS0 from echo cancellation with an ATM virtual connection. Mux 110 would interwork the ATM virtual connection from echo cancellation with the selected DS0 to a communications device in local network 100. CCM 130 would also exchange signaling with local network 100 and long distance network 108 during call set-up. As a result, a call connection is set up from long distance network 108 through ATM matrix 122 and mux 110 to local network 100. One can appreciate that mux 112 could have been used in the alternative to egress the call.

From the above examples, it can be seen that CCM 130 routes calls through the muxes and ATM matrix 120 for local calls. CCM 130 routes calls through echo cancellation and ATM matrix 122 for long distance calls. Communications system 106 could be deployed as a part of one of the local networks or as a part of one of the long distance networks. It could also be deployed in a stand-alone fashion.

Figure 2:
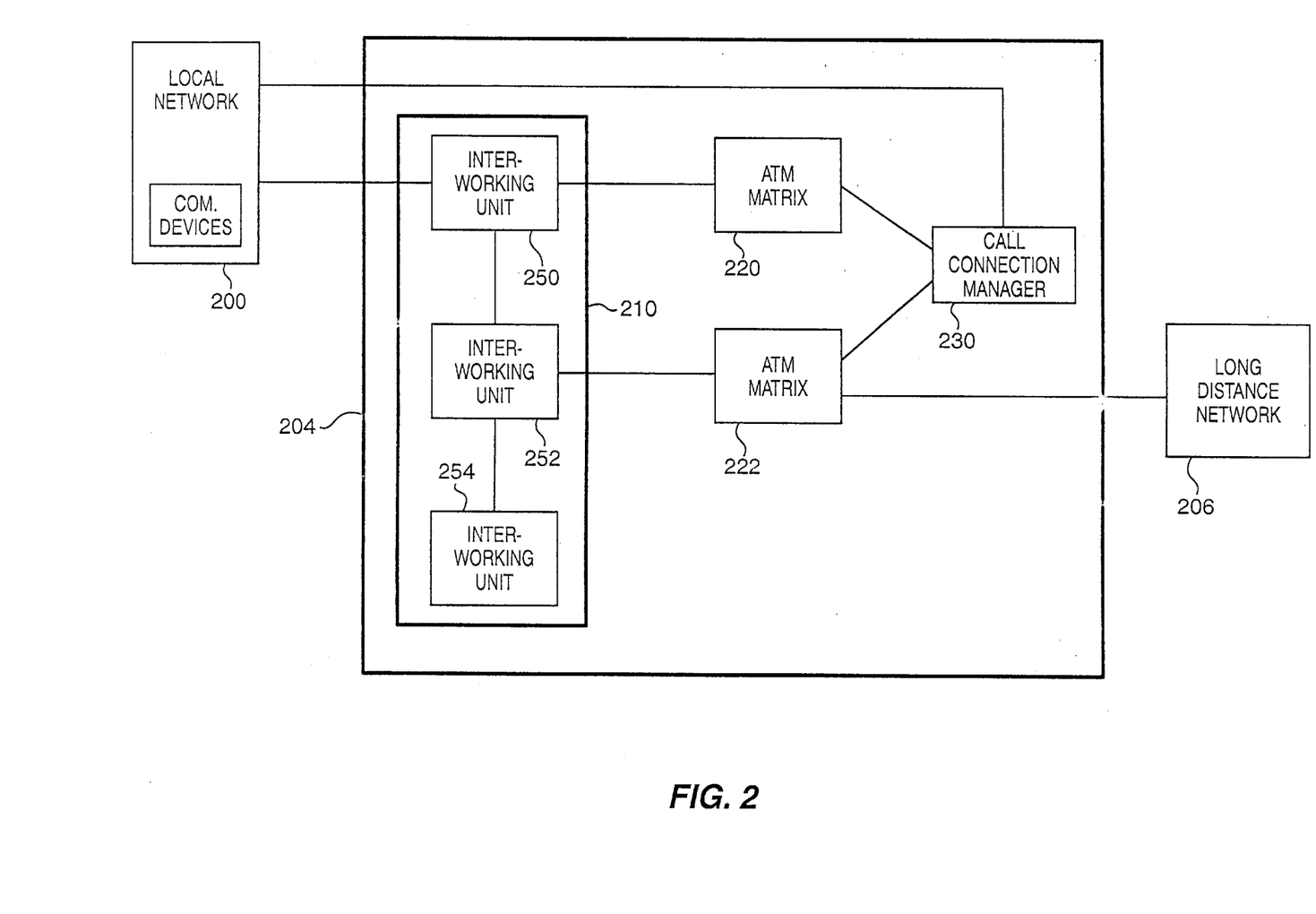
FIG. 2 is a block diagram of a version of the invention.

FIG. 2 depicts another example of the invention with the mux shown in greater detail with other elements omitted for purposes of clarity. Reference numbers on FIG. 2 correspond to similar devices from FIG. 1. Shown on FIG. 2 are: local network 200, communications system 204, and long distance network 206. Communications system 204 is comprised of mux 210, ATM matrix 220, ATM matrix 222, and CCM 230. These elements are interconnected and operate in accord with the corresponding elements of FIG. 1. Mux 210 is comprised of Interworking Unit (IWU) 250, IWU 252, and echo canceller 254. IWU 250 is externally connected to local network 200 and ATM matrix 220. IWU 250 is internally connected to IWU 252 with an ATM virtual connection. IWU 252 is externally connected to ATM matrix 222. IWU 252 is internally connected to echo canceller 254 with DS0, E0, or connections that contain DS0s or E0s. The IWUs interwork between DS0 connections and ATM virtual connections in response to control instructions from CCM 230. Echo canceller 254 removes echo from telecommunications traffic.

Take the example of a call between two communications devices in local network 200. Local network 200 would seize a DS0 port on IWU 250 of mux 210 and send an IAM to CCM 230. CCM 230 will process the IAM and identify the local network 200 as the destination. This could be done by analyzing the called number. CCM 230 would select an ATM virtual connection from IWU 250 through ATM matrix 220 and back to IWU 250, and select a DS0 from IWU 250 back to local network 200. CCM 230 would provide a control instruction to IWU 250 identifying the incoming DS0 from local network 200, the selected ATM virtual connection through ATM matrix 220 and back to IWU 250, and the DS0 from IWU 250 back to local network 200. IWU 250 would interwork the DS0 from local network 200 with the ATM virtual connection to ATM matrix 220. IWU 250 would then interwork the ATM virtual connection back from ATM matrix 220 with the DS0 back to local network 200.

Next, take the example of a call from local network 200 to long distance network 206. Local network 100 would seize a DS0 port on mux 210 and send an SS7 IAM to CCM 230. CCM 230 will process the IAM and identify long distance network 206 as the destination. This could be done by analyzing the called number. CCM 230 would select an ATM virtual connection from IWU 250 to IWU 252 that will be automatically interworked by IWU 252 with a DS0 to echo canceller 254. CCM 130 will also select an ATM virtual connection from IWU 252 through ATM matrix 222 to long distance network 206. CCM 230 would provide a control instruction to IWU 250 identifying the incoming DS0 from local network 900 and the selected ATM virtual connection to IWU 252 for echo cancellation. CCM 230 would also provide a control instruction to IWU 252 identifying the DS0 from echo canceller 254 and the selected ATM virtual connection through ATM matrix 222 to long distance network 206. IWU 250 would interwork the DS0 from local network 200 with the selected ATM virtual connection to IWU 252. IWU 252 would automatically interwork the selected ATM virtual connection from IWU 250 with a DS0 to echo canceller 254. Echo canceller 254 would remove the echo from the half of the call from local network 200 and return the DS0 to IWU 252. IWU 252 would then interwork the DS0 from echo canceller 254 with the selected ATM virtual connection through ATM matrix 222 to long distance network 206. CCM 230 would also exchange signaling with local network 200 and long distance network 206 during call set-up. As a result, a call connection is set up from local network 200 through IWU 250, IWU 252, echo canceller 254, and ATM matrix 222 to long distance network 206.

Next, take the example of a call from long distance network 206 to local network 200. Long distance network 206 would seize an ATM virtual connection through ATM matrix 222 to IWU 252 and send a call set-up message through ATM matrix 222 to CCM 230. CCM 230 will process the set-up message and identify local network 200 as the destination. This could be done by analyzing the called number. CCM 230 would select a DS0 from IWU 252 to echo canceller 254. After echo cancellation, this DS0 would automatically be interworked by IWU 252 with an ATM virtual connection to IWU 250. CCM 230 would also select a DS0 connection from IWU 250 to local network 200. CCM 230 would provide a control instruction to IWU 252 identifying the ATM virtual connection from long distance network 206 through ATM matrix 222 and the selected DS0 to echo canceller 254. CCM 230 would provide a control instruction to IWU 250 identifying the ATM virtual connection from IWU 252 and the selected outbound DS0 to local network 200. IWU 252 would interwork the ATM virtual connection from long distance network 206 with the DS0 to echo canceller 254. Echo canceller 254 would remove the echo from the half of the call from local network 200 and return the DS0 to IWU 252. IWU 252 would automatically interwork the DS0 from echo canceller 254 with the ATM virtual connection to IWU 250 IWU 250 would interwork the ATM virtual connection from IWU 252 with the selected DS0 to local network 200. CCM 230 would also exchange signaling with local network 200 and long distance network 206 during call set-up. As a result, a call connection is set up from long distance network 206 through ATM matrix 222, IWU 252, echo canceller 254, and IWU 250 to local network 200.

From FIG. 2, it can be seen that CCM 230 routes local calls from IWU 250 to ATM matrix 220 for delivery to another mux and local network. For long distance calls that require echo cancellation, CCM 230 routes these calls through IWU 250, IWU 252, and echo canceller 254, and ATM matrix 222. Echo canceller 254 is depicted as internal to the mux, but it could also be externally located and connected by appropriate connections.

Figure 3:
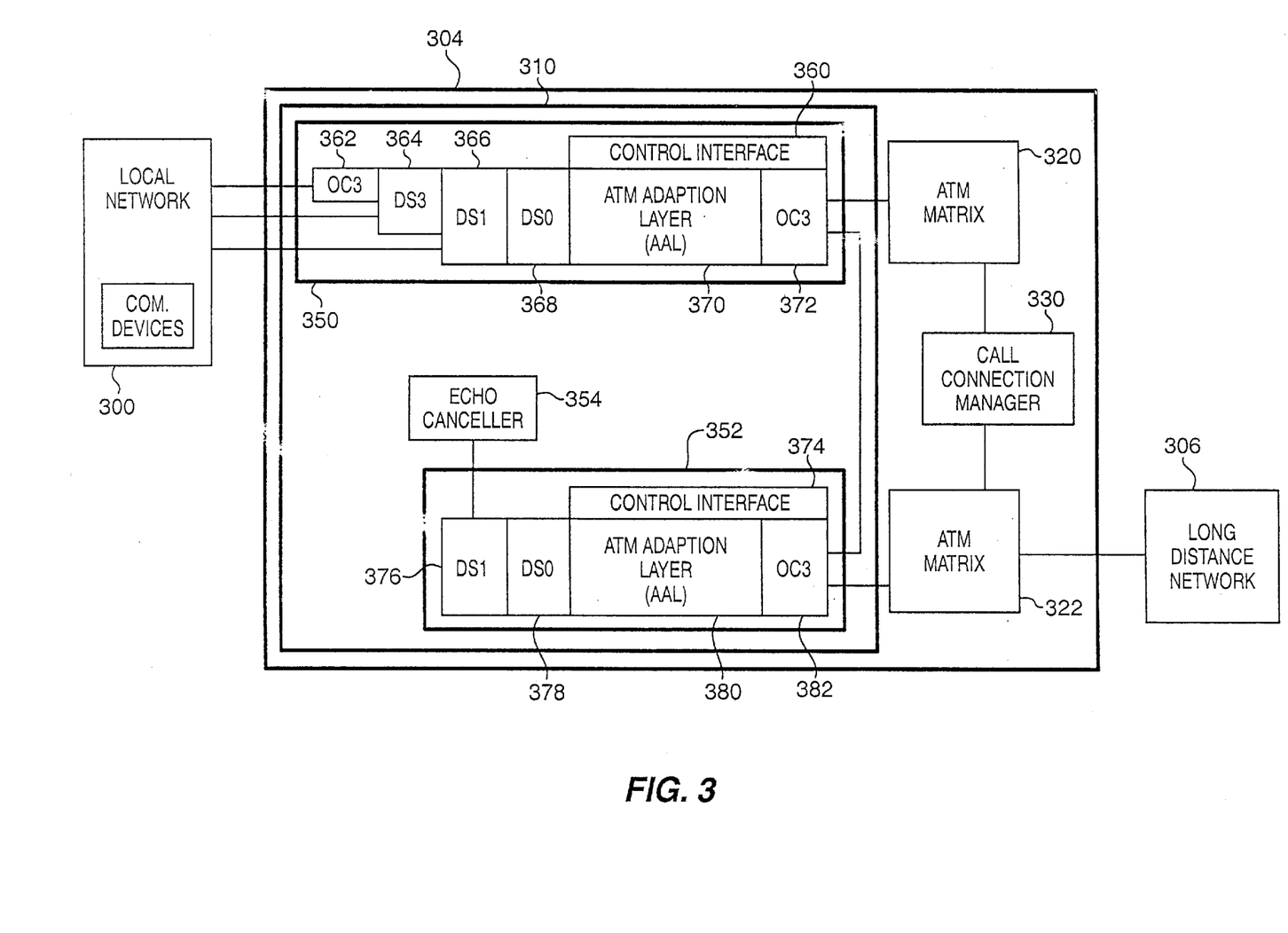
FIG. 3 is a block diagram of a version of the invention.

FIG. 3 shows one embodiment of the mux that is suitable for the present invention, but other muxes that support the requirements of the invention are also applicable. Reference numbers on FIG. 3 correspond to similar devices from FIGS. 1 and 2. Shown on FIG. 3 are local network 300, communications system 304, and long distance network 306. Communications system 304 includes mux 310, ATM matrix 320, ATM matrix 322, and CCM 320. Mux 310 includes IWU 350, IWU 352, and echo canceller 354. The elements listed above are-interconnected and operate in accord with the corresponding elements of FIGS. 1 and 2.

IWU 350 comprises: control interface 360, OC-3 interface 362, DS3 interface 364, DS1 interface 366, DS0 interface 368, ATM adaption Layer (AAL) 370, and OC-3 interface 372. OC-3 interface 362 accepts the OC-3 format and makes the conversion to DS3. DS3 interface 364 accepts the DS3 format and makes the conversion to DS1. DS3 interface 364 can accept DS3s from OC-3 interface 362 or from an external connection. DS1 interface 366 accepts the DS1 format and makes the conversion to DS0. DS1 interface 366 can accept DS1s from DS3 interface 364 or from an external connection. DS0 interface 368 accepts the DS0 format and provides an interface to AAL 370. OC-3 interface 372 is operational to exchange ATM cells with AAL 370 and ATM matrix 320. It also provides a control link to control interface 360. Control interface 360 accepts messages from CCM 330 over an ATM virtual connection through ATM matrix 320 and OC-3 interface 372. Control interface 360 provides DS0/virtual connection assignments to AAL 370 for implementation. AAL 370 interworks DS0s with virtual connections in response to control interface 360.

IWU 352 comprises: control interface 74, DS1 interface 376, DS0 interface 378, AAL 380, and OC-3 interface 382. DS1 interface 376 accepts the DS1 format and makes the conversion to DS0. DS1 interface 376 can accept DS1s from echo canceller 354. DS0 interface 378 accepts the DS0 format and provides an interface to AAL 380. OC-3 interface 382 is operational to exchange ATM cells with AAL 380 and ATM matrix 322. It also provides a control link to control interface 374. Control interface 374 accepts messages from CCM 330 over an ATM virtual connection through ATM matrix 322 and OC-3 interface 382. Control interface 374 provides DS0/virtual connection assignments to AAL 380 for implementation. AAL 380 interworks DS0s with virtual connections in response to control interface 360. In some cases, AAL 380 is pre-provisioned to automatically interwork a DS0 with an ATM virtual connection without requiring a control instruction.

An AAL comprises both a convergence sublayer and a segmentation and reassembly (SAR) layer. The AAL obtains the identity of the DS0 and the ATM VPI/VCI from the control interface. The AAL is operational to convert between the DS0 format and the ATM format, either automatically, or in response to control instructions. Acknowledgments that the assignments have been implemented may be sent back to the CCM if desired. AALs are known in the art and information about AALs is provided by International Telecommunications Union (ITU) document I.363. An AAL for voice is also described in U.S. Pat. No. 5,606,553 entitled "Cell Processing for Voice Transmission", and hereby incorporated by reference into this application. A technique for processing VPI/VCIs is disclosed in patent application Ser. No. 08/633,832, filed on May 28, 1996, entitled "Telecommunications System with a Connection Processing System," and hereby incorporated by reference into this application. DS0 connections are bidirectional and ATM connections are typically unidirectional. As a result, two virtual connections in opposing directions will typically be required for each DS0. As discussed, this can be accomplished provisioning the cross-connects with companion VPI/VCIs in the opposite direction as the original VPI/VCIs.

The Signaling Processor

The signaling processor is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in a U.S. patent application Ser. No. 08/754,349, filed on Nov. 22, 1996, which is entitled "Telecommunication System", and which is incorporated herein by reference.

In addition to selecting connections, the CCM performs many other functions in the context of call processing. It not only can control routing and select the actual connections, but it can also validate callers, control echo cancellers, generate billing information, invoke intelligent network functions, access remote databases, manage traffic, and balance network loads. One skilled in the art will appreciate how the CCM described below can be adapted to operate in the above embodiments.

Figure 4:
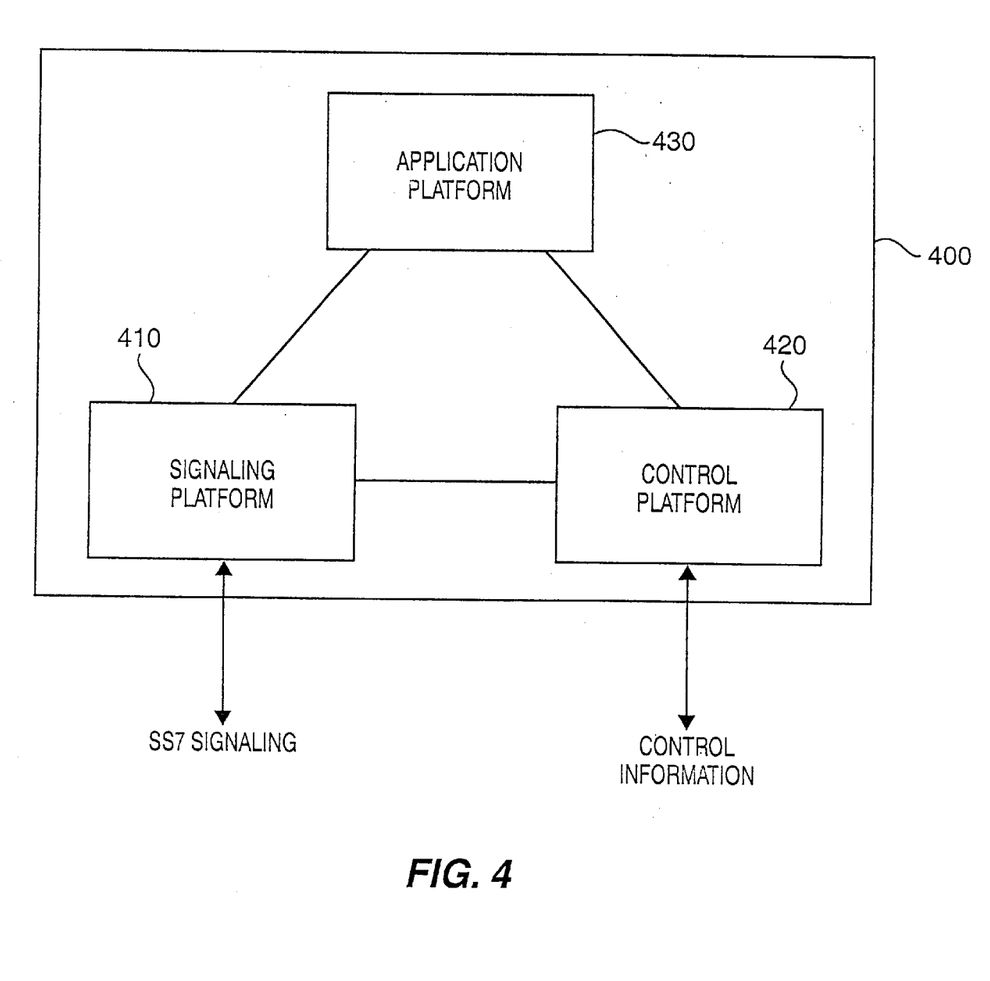
FIG. 4 is a logic diagram of a version of the invention

FIG. 4 depicts a version of the CCM. Other versions are also contemplated. In the embodiment of FIG. 4, CCM 400 controls an ATM interworking multiplexer (mux) that performs interworking of DS0s and VPI/VCIs. However, the CCM may control other communications devices and connections in other embodiments.

CCM 400 comprises signaling platform 410, control platform 420, and application platform 430. Each of the platforms 410, 420, and 430 is coupled to the other platforms.

Signaling platform 410 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). Control platform 420 is externally coupled to a mux control, an echo control, a resource control, billing, and operations. Signaling platform 410 comprises MTP levels 1–3, ISUP, TCAP, SCCP, and INAP functionality and is operational. to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

Control platform 420 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might acknowledgments and status information.

The resource control interface exchanges messages with external resources. Examples of such resources are devices that implement. continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of CCM 400. One skilled in the art will appreciate how to produce the software for the interfaces in control platform 420.

Application platform 430 is functional to process signaling information from signaling platform 410 in order to select connections. The identity of the selected connections are provided to control platform 420 for the mux interface. Application platform 430 is responsible for validation, translation, routing, call control, exceptions, screening, and error handling. In addition to providing the control requirements for the mux application platform 430 also provides requirements for echo control and resource control to the appropriate interface of control platform 420. In addition, application platform 430 generates signaling information for transmission by signaling platform 410. The signaling information might be ISUP, INAP, or TCAP messages to external network elements. Pertinent information for each call is stored in a call control block (CCB) for the call. The CCB can be used for tracking and billing the call.

Application platform 430 operates in general accord with the Basic Call Model (BCM) defined by the ITU. An instance of the BCM is created to handle each call. The BCM includes an originating process and a terminating process. Application platform 430 includes a service switching function (SSF) that is used to invoke the service control function (SCF). Typically, the SCF is contained in a service control point (SCP). The SCF is, queried with TCAP or INAP messages. The originating or terminating processes will access remote databases with intelligent network (IN) functionality via the SSF function.

Software requirements for application platform 430 can be produced in specification and description language (SDL) defined in ITU-T Z.100. The SDL can be converted into C code. Additional C and C++ code can be added as required to establish the environment.

CCM 400 can be comprised of the above-described software loaded onto a computer. The computer can be an Integrated Micro Products (IMP) FT-Sparc 600 using the Solaris operating system and conventional-database systems. It may be desirable. to utilize the multi-threading capability of a Unix operating system.

From FIG. 4, it can be seen that application platform 430 processes signaling information to control numerous systems and facilitate call connections and services. The SS7 signaling is exchanged with external components through signaling platform 410, and control information is exchanged with external systems through control platform 420. Advantageously, CCM 400 is not integrated into a switch CPU that is coupled to a switching matrix. Unlike an SCP, CCM 400 is capable of processing ISUP messages independently of TCAP queries.

SS7 Message Designations

SS7 messages are well known. Designations for various SS7 messages commonly are used. Those skilled in the art are familiar with the following message designations:

| | | |
|---|---|---|
| ACM | -- | Address Complete Message |
| ANM | -- | Answer Message |
| BLO | -- | Blocking |
| BLA | -- | Blocking Acknowledgment |
| CPG | -- | Call Progress |
| CRG | -- | Charge Information |
| CGB | -- | Circuit Group Blocking |
| CGBA | -- | Circuit Group Blocking Acknowledgment |
| GRS | -- | Circuit Group Reset |
| GRA | -- | Circuit Group Reset Acknowledgment |
| CGU | -- | Circuit Group Unblocking |
| CGUA | -- | Circuit Group Unblocking Acknowledgment |
| CQM | -- | Circuit Group Query |
| CQR | -- | Circuit Group Query Response |
| CRM | -- | Circuit Reservation Message |
| CRA | -- | Circuit Reservation Acknowledgment |
| CVT | -- | Circuit Validation Test |
| CVR | -- | Circuit Validation Response |
| CFN | -- | Confusion |
| COT | -- | Continuity |
| CCR | -- | Continuity Check Request |
| EXM | -- | Exit Message |
| INF | -- | Information |
| INR | -- | Information Request |
| IAM | -- | Initial Address |
| LPA | -- | Loop Back Acknowledgment |
| PAM | -- | Pass Along |
| REL | -- | Release |
| RLC | -- | Release Complete |
| RSC | -- | Reset Circuit |
| RES | -- | Resume |

| | | |
|---|---|---|
| SUS | -- | Suspend |
| UBL | -- | Unblocking |
| UBA | -- | Unblocking Acknowledgment |
| UCIC | -- | Unequipped Circuit Identification Code. |

CCM Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 5:
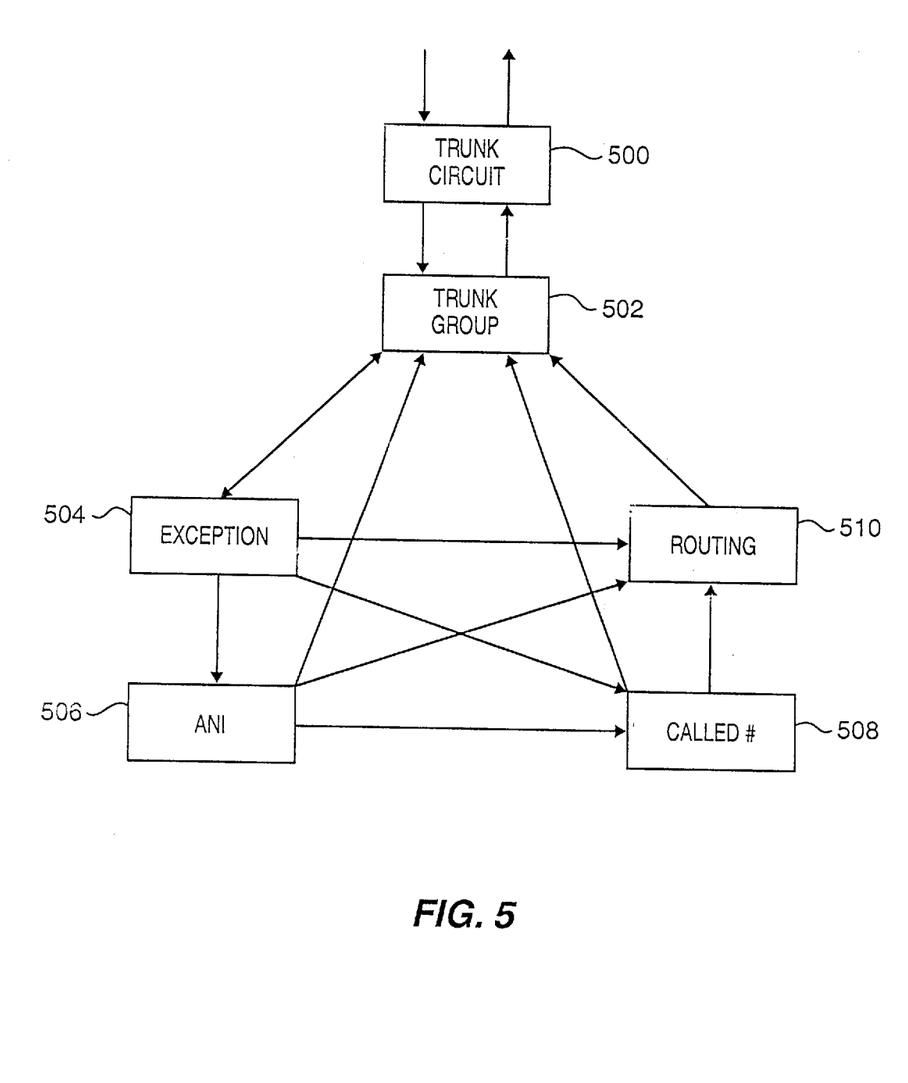
FIG. 5 is a logic diagram of a version of the invention.

FIG. 5 depicts a data structure used by application platform 430 of FIG. 4 to execute the basic call model. This is accomplished through a series of tables that point to one another in various ways. The pointers are typically comprised of next function and next index designations. The next function points to the next table, and the next index points to an entry or a range of entries in that table. The data structure has trunk circuit table 500, trunk group table 502, exception table 504, ANI table 506, called number table 508, and routing table 510.

Trunk circuit table 500 contains information related to the connections. Typically, the connections are DS0 or ATM virtual connections. Initially, trunk circuit table 500 is used to retrieve information about the originating connection. Later, the table is used to retrieve information about the terminating connection. When the originating connection is being processed, the trunk group number in trunk circuit table 500 points to the applicable trunk group for the originating connection in trunk group table 502.

Trunk group table 502 contains information related to the originating and terminating trunk groups. When the originating connection is being processed, trunk group table 502 provides information relevant to the trunk group for the originating connection and typically points to exception table 504.

Exception table 504 is used to identify various exception conditions related to the call that may influence the routing or other handling of the call. Typically, exception table 504 points to ANI table 506. Although, exception table 504 may point directly to trunk group table 502, called number table 508, or routing table 510.

ANI table 506 is used to identify any special characteristics related to the caller's number. The caller's number is commonly known as automatic number identification (ANI). ANI table 506 typically points to called number table 508. Although, ANI table 506 may point directly to trunk group table 502 or routing table 510.

Called number table 508 is used to identify routing requirements based on the called number. This will be the case for standard telephone calls. Called number table 508 typically points to routing table 510. Although, it may point to trunk group table 502.

Routing table 510 has information relating to the routing of the call for the various connections. Routing table 510 is entered from a pointer in either exception table 504, ANI table 506, or called number table 508. Routing table 510 typically points to a trunk group in trunk group table 502.

When exception table 504, ANI table 506, called number table 508, or routing table 510 point to trunk group table 502, they effectively select the terminating trunk group. When the terminating connection is being processed, the trunk group number in trunk group table 502 points to the trunk group that contains the applicable terminating connection in trunk circuit table 502.

The terminating trunk circuit is used to extend the call. The trunk circuit is typically a VPI/VCI or a DS0. Thus it can be seen that by migrating through the tables, a terminating connection can be selected for a call.

Figure 6:
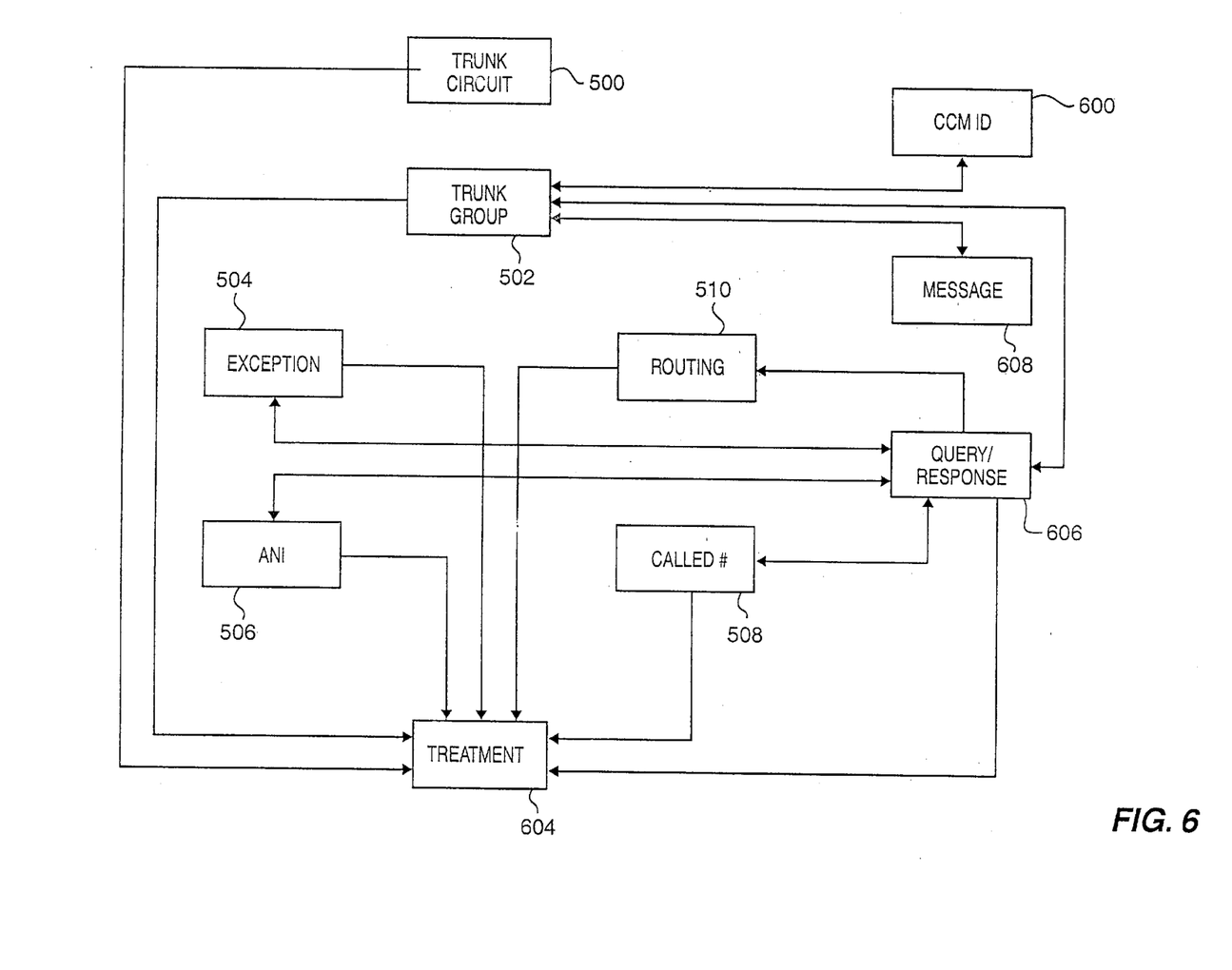
FIG. 6 is a logic diagram of a version of the invention.

FIG. 6 is an overlay of FIG. 5. The tables from FIG. 5 are present, but for clarity, their pointers have been omitted, but their reference numbers have been retained. FIG. 6 illustrates additional tables that can be accessed from the tables of FIG. 5. These include CCM ID table 600, treatment table 604, query/response table 606, and message table 608.

CCM ID table 600 contains various CCM SS7 point codes. It can be accessed from trunk group table 502, and it points back to trunk group table 502.

Treatment table 604 identifies various special actions to be taken in the course of call processing. This will typically result in the transmission of a release message (REL) and a cause value. Treatment table 604 can be accessed from trunk circuit table 500, trunk group table 502, exception table 504, ANI table 506, called number table 508, routing table 510, and query/response table 606.

Query/response table 606 has information used to invoke the SCF. It can be accessed by trunk group table. 502, exception table 504, ANI table 506, called number table 508, and routing table 510. It points to trunk group table 502, exception table 504, ANI table 506, called number table 508, routing table 510, and treatment table 604.

Message table 608 is used to provide instructions for messages from the termination side of the call. It can be accessed by trunk group table 502 and points to trunk group table 502.

Figure 7:
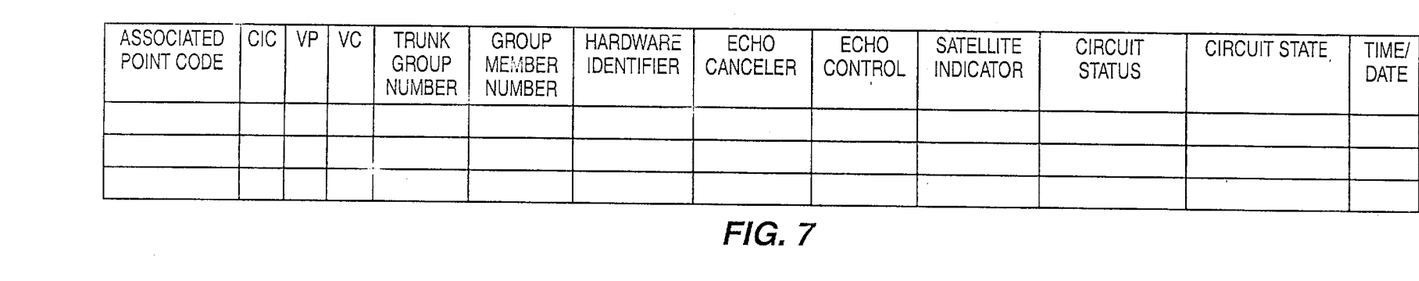
FIG. 7 is a logic table in a version of the invention.

FIGS. 7–14 depict examples of the various tables described above. FIG. 7 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel. (VC) also can be used for identification. The group member number is a numeric code that is used for terminating circuit selection. The hardware identifier identifies the location of the hardware associated with the originating circuit. The echo canceller (EC) identification (ID) entry identifies the echo canceller for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

Figure 8:
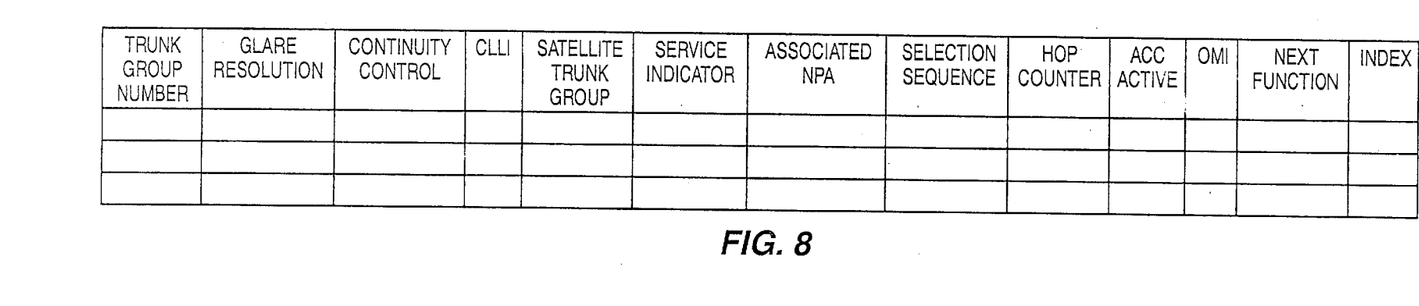
FIG. 8 is a logic table in a version of the invention.

FIG. 8 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

Figure 9:
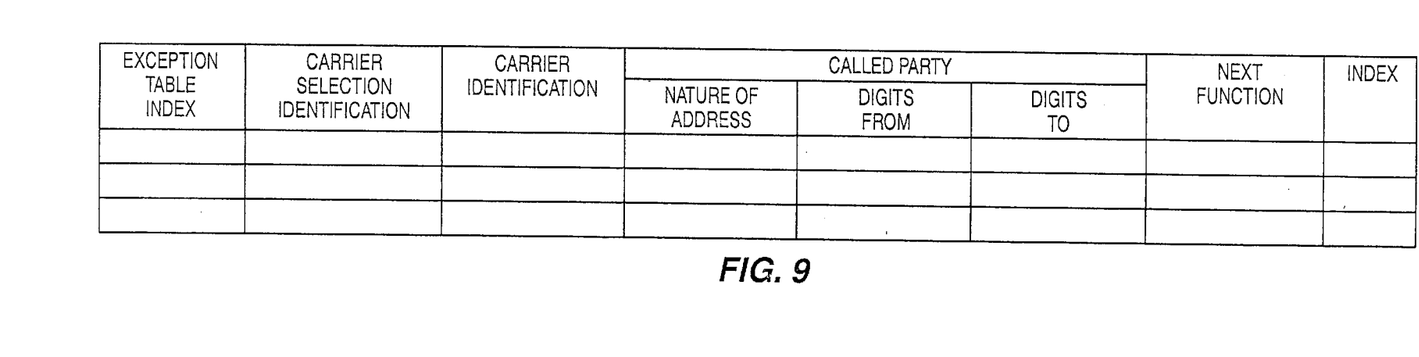
FIG. 9 is a logic table in a version of the invention.

FIG. 9 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and if filled with less than 15 digits, is filled with 9s for the remaining digits. The next function and next index entries point to the next table which is typically the ANI table.

Figure 10:
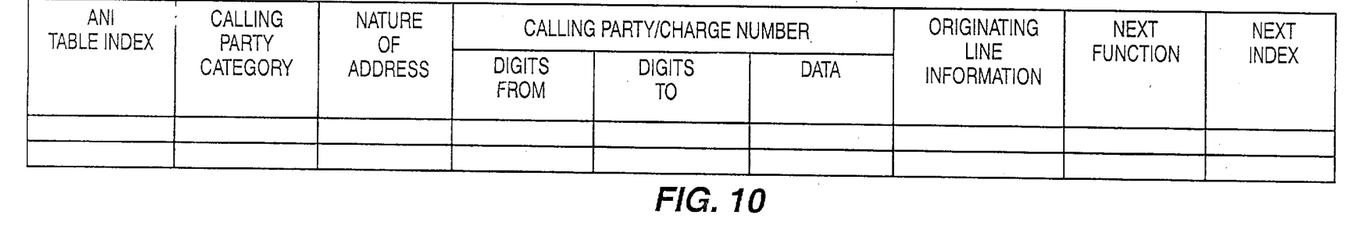
FIG. 10 is a logic table in a version of the invention.

FIG. 10 depicts an example of the ANI table. The index is used to enter the fields of the table. The calling party category differentiates among types of calling parties, for example, test calls, emergency calls, and ordinary calls. The calling party/charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

Figure 11:
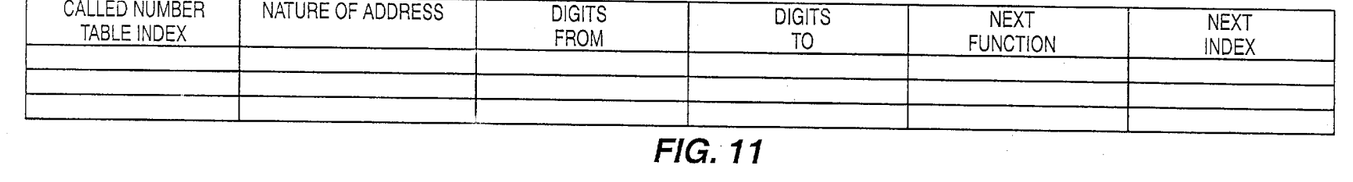
FIG. 11 is a logic table in a version of the invention.

FIG. 11 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 9. The next function and next index point to the next table which is typically the routing table.

Figure 12:
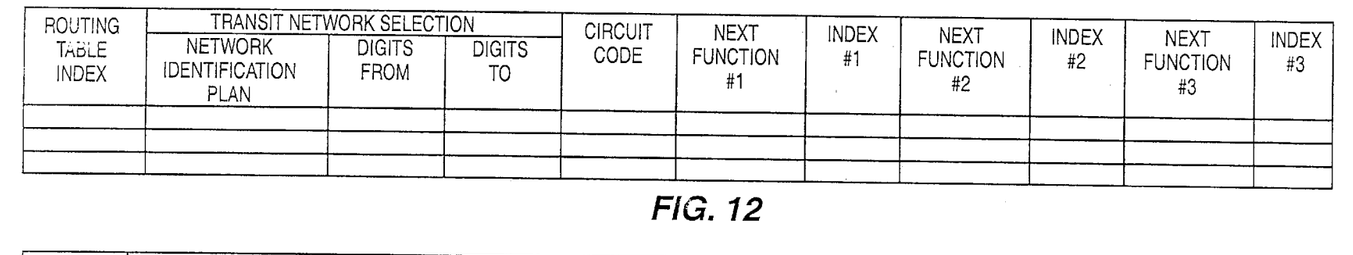
FIG. 12 is a logic table in a version of the invention.

FIG. 12 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 7–12 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

Figure 13:
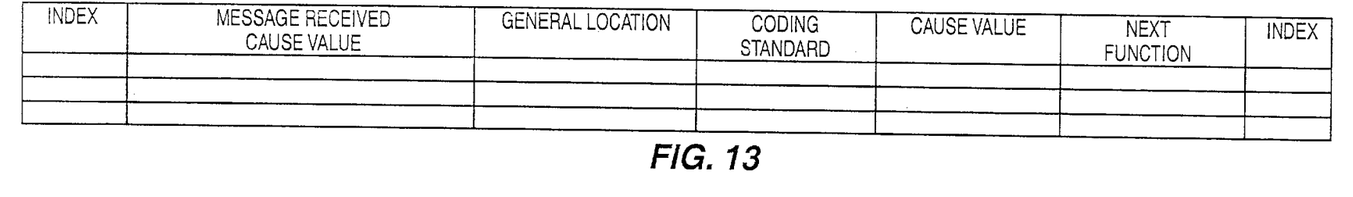
FIG. 13 is a logic table in a version of the invention.

FIG. 13 depicts. an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

Figure 14:
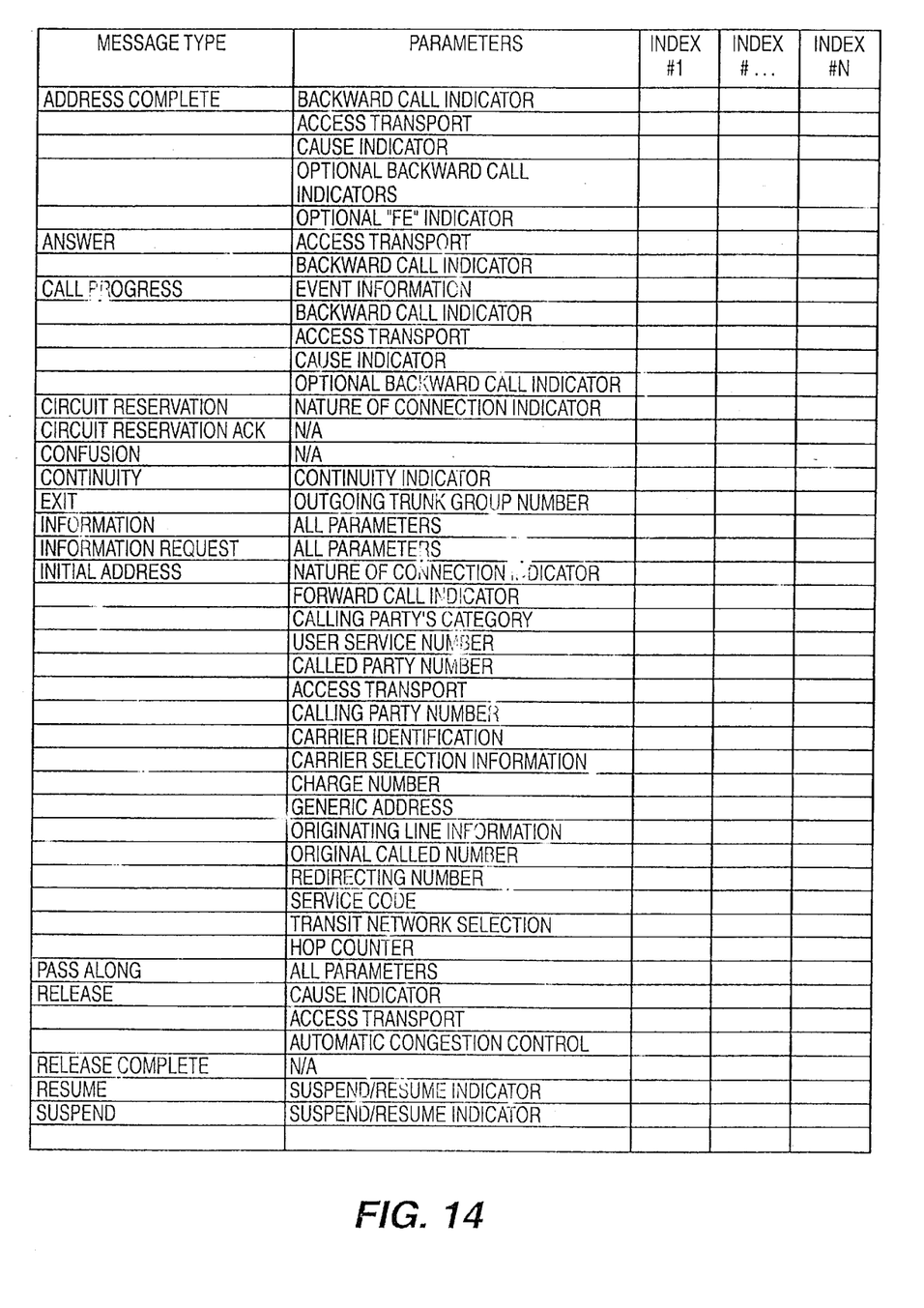
FIG. 14 is a logic table in a version of the invention.

FIG. 14 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

I claim:

1. A method of operating a communication system comprising:
   receiving a first Time Division Multiplex (TDM) communication and a first signaling message;
   processing the first signaling message to determine if echo cancellation is required;
   if echo cancellation is required, selecting a first identifier and a second identifier;
   converting the first TDM communication into a first asynchronous communication with the first identifier;
   routing the first asynchronous communication to an echo canceller based on the first identifier;
   converting the first asynchronous communication into a second TDM communication;
   canceling echo from the second TDM communication;
   after canceling the echo, converting the second TDM communication into a second asynchronous communication with the second identifier; and
   routing the second asynchronous communication based on the second identifier.

2. The method of claim 1 wherein the first signaling message comprises an initial address message.

3. The method of claim 1 wherein the first TDM communication is from a DS0 connection.

4. The method of claim 1 wherein the first asynchronous communication comprises an asynchronous transfer mode communication and the first identifier comprises an asynchronous transfer mode identifier.

5. The method of claim 1 further comprising generating and transmitting a second signaling message indicating the second identifier.

6. The method of claim 5 wherein the second signaling message comprises an initial address message.

7. A method of operating a communication system comprising:
   receiving a first signaling message and a first asynchronous communication with a first identifier;
   processing the first signaling message to determine if echo cancellation is required;
   if echo cancellation is required, selecting a second identifier, a third identifier, and a first TDM connection;
   converting the first asynchronous communication into a second asynchronous communication with the second identifier;
   routing the second asynchronous communication to an echo canceller based on the second identifier;
   converting the second asynchronous communication into a first TDM communication;
   canceling echo from the first TDM communication;
   after canceling the echo, converting the first TDM communication into a third asynchronous communication with the third identifier;
   routing the third asynchronous communication to an interworking unit based on the third identifier;
   converting the third asynchronous communication into a second TDM communication; and
   routing the second TDM communication over the first TDM connection.

8. The method of claim 7 wherein the first signaling message comprises an initial address message.

9. The method of claim 7 wherein the first TDM connection comprises a DS0 connection.

10. The method of claim 7 wherein the second asynchronous communication comprises an asynchronous transfer mode communication and the second identifier comprises an asynchronous transfer mode identifier.

11. The method of claim 7 further comprising generating and transmitting a second signaling message indicating the DS0 connection.

12. The method of claim 11 wherein the second signaling message comprises an initial address message.

* * * * *